US008636518B2

(12) United States Patent  
Wetherbee (10) Patent No.: US 8,636,518 B2
(45) Date of Patent: Jan. 28, 2014

(54) SELF-EXPLORATION THERAPEUTIC ASSEMBLY AND METHOD OF USE

(75) Inventor: Mark Wetherbee, Fort Lauderdale, FL (US)

(73) Assignee: Simple Ideas, LLC, Fort Lauderdale, FL (US)

( * ) Notice: Subject to any disclaimer, the term of this patent is extended or adjusted under 35 U.S.C. 154(b) by 232 days.

(21) Appl. No.: 13/187,408

(22) Filed: Jul. 20, 2011

(65) Prior Publication Data

US 2013/0022946 A1    Jan. 24, 2013

(51) Int. Cl.
   *G09B 19/00*   (2006.01)
(52) U.S. Cl.
   USPC .......................................... 434/236; 434/238
(58) Field of Classification Search
   USPC .................................. 434/236–238
   See application file for complete search history.

(56) References Cited

U.S. PATENT DOCUMENTS

| | | |
|---|---|---|
| 3,471,964 A | 10/1969 | Cherry et al |
| 3,780,449 A | 12/1973 | Stephenson |
| 4,222,179 A | 9/1980 | Goody |
| 4,358,013 A | 11/1982 | Shebley |
| 4,413,442 A | 11/1983 | McSweeney |
| 4,595,367 A | 6/1986 | Forsyth |
| 4,755,141 A | 7/1988 | Nakai |
| 4,795,033 A | 1/1989 | Duffy |
| 4,950,194 A | 8/1990 | Gullace |
| 5,013,245 A | 5/1991 | Benedict |
| 5,194,030 A | 3/1993 | LeBoeuf et al. |
| 5,310,378 A | 5/1994 | Shannon |
| 5,407,201 A | 4/1995 | Whitehurst |
| 5,407,712 A * | 4/1995 | D'Allura ......................... 428/22 |
| 5,506,010 A | 4/1996 | Buck et al. |
| 5,522,758 A | 6/1996 | Liu et al. |
| 5,720,481 A | 2/1998 | Graham |
| 5,944,312 A | 8/1999 | Darneille |
| 6,733,280 B1 * | 5/2004 | Livne et al. ................... 431/288 |
| 7,089,860 B2 * | 8/2006 | Harris et al. .................. 101/483 |
| 7,182,601 B2 | 2/2007 | Donnan |
| 7,331,841 B2 | 2/2008 | Okamoto et al. |
| 2005/0069843 A1 | 3/2005 | Bagues |
| 2006/0254098 A1 | 11/2006 | Fu |
| 2007/0079409 P1 | 4/2007 | Tabron |
| 2008/0220401 A1 | 9/2008 | Cantor |
| 2010/0032899 A1 | 2/2010 | Gearty |
| 2011/0039239 A1 | 2/2011 | Futoran |

* cited by examiner

*Primary Examiner* — Benjamin Layno
(74) *Attorney, Agent, or Firm* — Scott D. Smiley; Mark C. Johnson; Yongae Jun (57) ABSTRACT

A self-exploration assembly includes a base and a plurality of petals each shaped so that when the plurality of petals are coupled to the base in a first orientation, the plurality of petals together resemble an onion, and, when the plurality of petals are coupled to the base in a second orientation, the plurality of petals resemble a flower.

21 Claims, 8 Drawing Sheets

SELF-EXPLORATION THERAPEUTIC ASSEMBLY AND METHOD OF USE

FIELD OF THE INVENTION

The present invention relates generally to mental health therapy, and more particularly, relates to an onion-resembling assembly that leads a user along a path of self exploration where a flower-reassembly assembly is ultimately formed.

BACKGROUND OF THE INVENTION

Although there are many situations where individuals face mental barriers that keep him or her from doing what they should or would like to be doing or feeling, to date, no therapy has been shown to be completely effective. Examples of mental barriers include depression, addiction, obsessions, compulsions, mental disorders, and many more. Individuals suffering with one or more of these co-occurring disorders often feel helpless to overcome them, even though that may be far from the truth.

Over the years, therapists have developed many methods for assisting individuals in realizing that they have the ability to overcome the conditions that are negatively affecting their lives. Many of these therapies are focused on encouraging the individual to look at and think about themselves in a way that they have not in the past. These therapies are often referred to as self-exploration therapies.

Several such self-exploration therapies involve systematically inspiring the individual to contemplate certain aspects of themselves, their lives, their past, their future, aspects of others individuals, and many topics. These self-exploration topics are most frequently presented in list form in, for example, a book. Working through lists is frequently found to be unexciting and does not necessarily provide a goal that the participant can visualize. For this reason, many persons are unsuccessful in completing the list.

Numerous self-improvement programs teach a theoretical "onion" concept, where the participant figuratively systematically peels away layers of themselves before they can arrive at the root of the issue. However, figuratively performing therapies makes it easy to lose focus and is not as rewarding as physically manipulating an object. Peeling an actual onion, as is well known, is messy and causes eye irritation.

Therefore, a need exists to overcome the problems with the prior art as discussed above.

SUMMARY OF THE INVENTION

The invention provides a self-exploration therapeutic assembly that overcomes the hereinafore-mentioned disadvantages of the heretofore-known devices and methods of this general type and that presents a physical model of an onion with individual layers that can be removed to reveal a therapeutic message or exercise and replaced in a reverse orientation, whereby when all or several of the petals have been reversed, the model resembles a flower.

With the foregoing and other objects in view, there is provided, in accordance with the invention, a self-exploration assembly that includes a base and a plurality of petals each shaped so that when the plurality of petals are coupled to the base in a first orientation, the plurality of petals together resemble an onion, and, when the plurality of petals are coupled to the base in a second orientation, the plurality of petals resemble a flower.

In accordance with a further feature of the present invention, the first orientation is substantially between a 90 degree and a 180 degree rotation from the second orientation.

In accordance with yet another feature of the present invention, each of the plurality of petals comprises a message on at least one surface thereof.

In accordance with one more feature of the present invention, the base includes a plurality of receiving areas, each receiving area shaped to accept a portion of one of the plurality of petals.

In accordance with a feature of the present invention, the base includes an upper surface having a first group of the plurality of receiving areas and a side surface having a second group of the plurality of receiving areas.

In accordance with a further feature of the present invention, the second orientation includes a first group of the plurality of petals coupled to the first group of the plurality of receiving areas and a second group of the plurality of petals coupled to the second group of the plurality of receiving areas.

In accordance with another feature of the present invention, a first one of the receiving areas defines a first longitudinal axis and a second one of the receiving areas defines a second longitudinal axis, the second longitudinal axis being in a different plane than the first longitudinal axis.

In accordance with yet another feature of the present invention, the plurality of petals have a first shape when in the first orientation and a second shape different from the first shape when in the second orientation.

In accordance with another feature, an embodiment of the present invention includes a base defining a plurality of receiving areas and a plurality of petals each having a securing member shaped to couple to one of the plurality of receiving areas and each shaped so that when the plurality of petals are coupled to the base in a first orientation, the plurality of petals together resemble an onion, and, when the plurality of petals are coupled to the base in a second orientation substantially opposite the first orientation, the plurality of petals resemble a flower.

In accordance with another feature, an embodiment of the present invention includes a method of conducting self-discovery, where the method includes providing a base and a plurality of petals each shaped so that when the plurality of petals are coupled to the base in a first orientation, the plurality of petals together resemble an onion, and, when the plurality of petals are coupled to the base in a second orientation, the plurality of petals resemble a flower. The method further includes coupling each of the plurality of petals to the base in the first orientation, selectively removing a first one of the plurality of petals from the base, reading a message coupled to the first one of the plurality of petals, and coupling the first one of the plurality of petals to the base in the second orientation.

In accordance with a further feature of the present invention, the method further includes selectively removing a second one of the plurality of petals from the base, reading a message coupled to the second one of the plurality of petals; and coupling the second one of the plurality of petals to the base in the second orientation.

Although the invention is illustrated and described herein as embodied in a self-exploration therapeutic assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the portion of the base, e.g., a receiving area, that couples to the petals. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient self-exploration therapeutic assembly that resembles an onion before its use and a flower after its use. Embodiments of the invention provide a base that removably secures a plurality of layers/petals that can be individually removed to reveal a therapeutic message or exercise. In addition, embodiments of the invention provide a base that is able to receive the layers/petals in an orientation that is substantially opposite from their original orientation within the base, whereby the reverse orientation of the layers/petals causes the assembly to resemble a flower.

Figure 1:
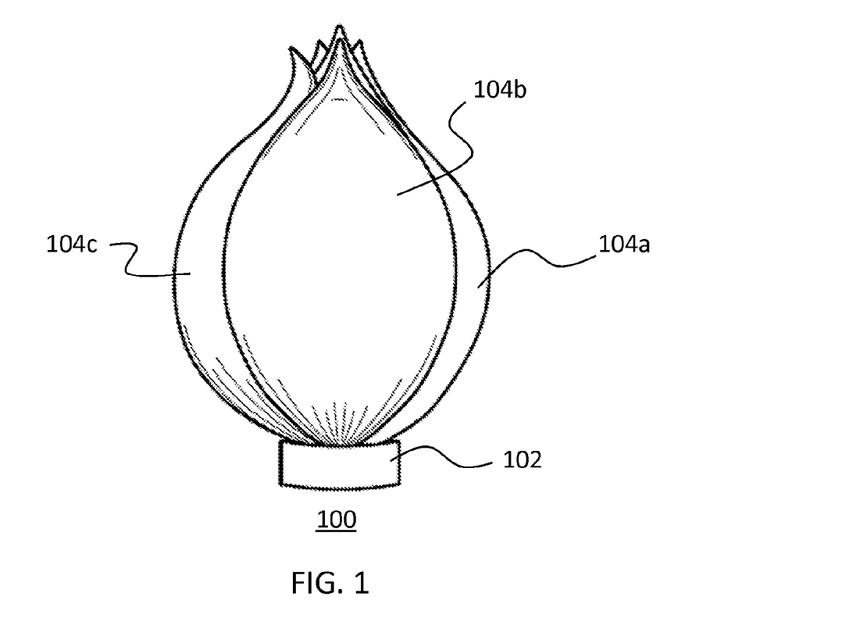
FIG. 1 is a side elevational view of a self-exploration therapeutic assembly that resembles an onion, in accordance with the present invention.

Referring now to FIG. 1, one embodiment of the present invention is shown in a side elevational view. FIG. 1 shows several advantageous features of the present invention, but, as will be described below, the invention can be provided in several shapes, sizes, combinations of features and components, and varying numbers and functions of the components.

The first example of a self-exploration therapeutic assembly 100, as shown in FIG. 1, includes a base 102. Coupled to the base 102 is a plurality of layers/petals 104a-n, where the number of layers/petals between "a" and "n" can be any number. Each layer/petal 104a-n is shaped so that when the plurality of layers/petals 104a-n are coupled to the base 102 in a first orientation, the first orientation being illustrated in FIG. 1, the plurality of layers/petals 104a-n together resemble an onion.

Figure 2:
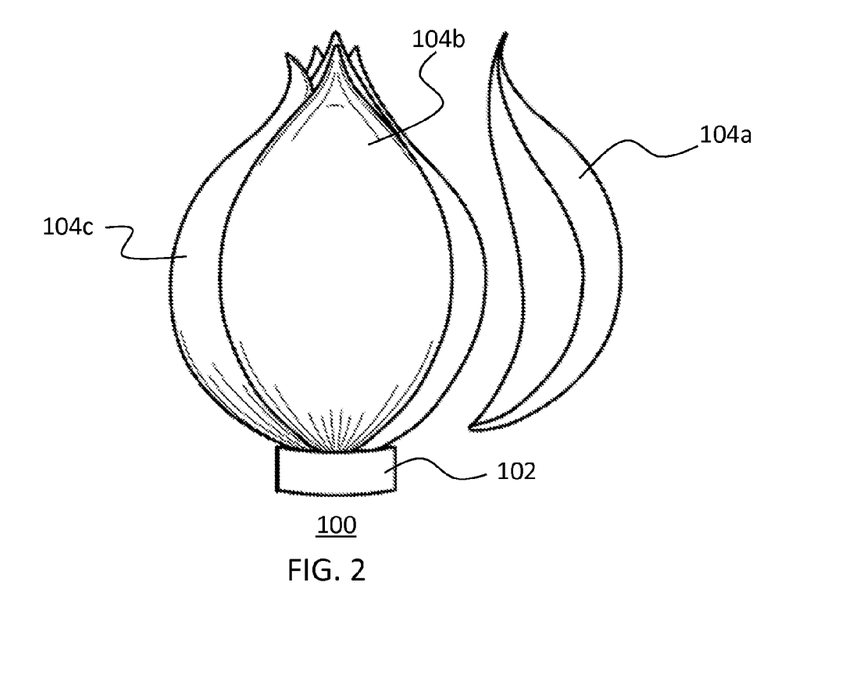
FIG. 2 is a side elevational view of a the self-exploration therapeutic assembly of FIG. 1, with a petal separated, in accordance with the present invention.
Figure 8:
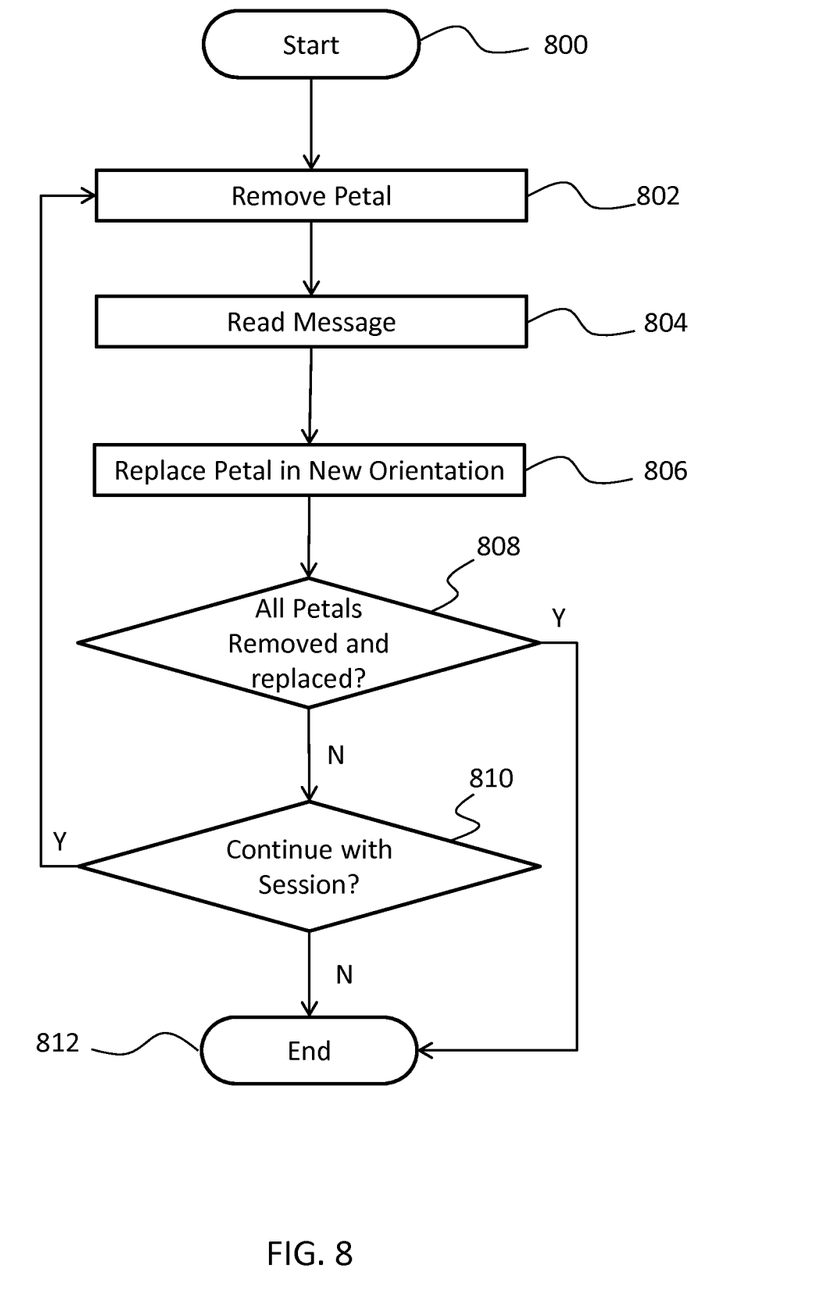
FIG. 8 is a flow diagram illustrating a process for using the self-exploration therapeutic assembly of FIG. 1.

The following figures will be described in conjunction with the process flow chart of FIG. 8. The process of FIG. 8 begins at step 800 and moves directly to step 802, where a user removes a first layer/petal 104a from the base 102. This step is illustrated in FIG. 2, where the first layer/petal 104a is separated from the base 102.

Figure 3:
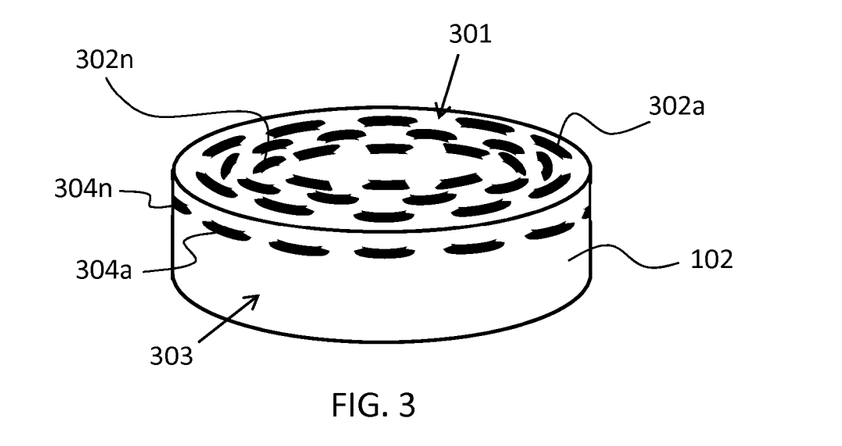
FIG. 3 is a perspective view of a base of the self-exploration therapeutic assembly of FIG. 1, in accordance with the present invention.

One embodiment of the base 102 is shown in the perspective view of FIG. 3, where the base 102 is shown provided with a plurality of receiving areas 302a-n on an upper surface 301, where the number of receiving areas 302 between "a" and "n" can be any number. In this embodiment, the receiving areas 302a-n are shown as simple slots formed within the base 102 and each receiving area 302a-n is shaped to accept a portion 406, shown in FIG. 4, of one of the plurality of layers/petals 104a-n. The receiving areas 302a-n are not limited, however, to slots. The receiving areas 302a-n can be raised areas that insert within recessed areas of the layers/petals 104a-n. The receiving areas 302a-n can also be structures that are neither raised nor recessed, for instance, magnets that magnetically receive and hold magnets of opposite polarity on the layers/petals 104a-n, VELCRO, and any other. The base 102 is also shown as including a plurality of receiving areas 304a-n on a side surface 303, where the number of receiving areas 304 between "a" and "n" can be any number. The receiving areas 302a-n on the upper surface 301 and the receiving areas 304a-n on the side surface 303 face in different directions. That is, the receiving areas 302a-n on the upper surface 301 can be thought of as having a longitudinal axis that is along the direction in which its corresponding petal 104a-n would attach to the receiving area 302a-n. Similarly, the receiving areas 304a-n on the side surface 303 can be thought of as having a longitudinal axis that is along the direction in which its corresponding petal 104a-n would attach to the receiving area 304a-n. As will be described and shown, particularly, in FIG. 7, the longitudinal axis of the receiving areas 302a-n on the upper surface 301 are in a different plane than the longitudinal axis of the receiving areas 304a-n on the side surface 303.

Figure 4:
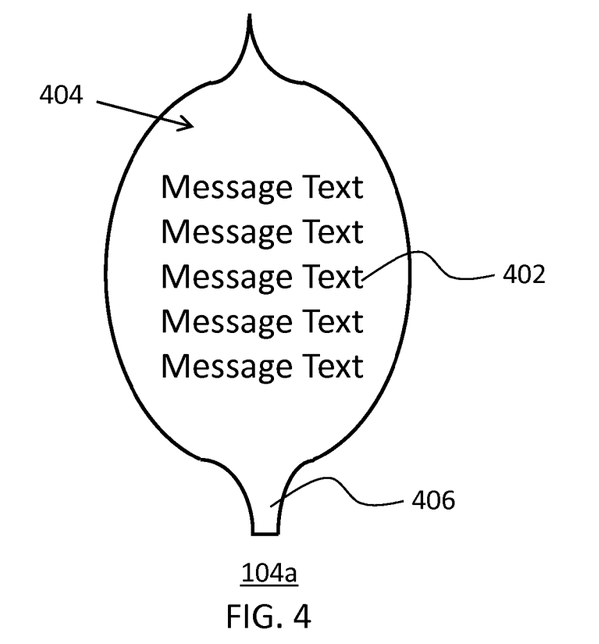
FIG. 4 is an elevational view of petal with a message attached, in accordance with the present invention.

In step 804, the user reads a message 402, an example of which is shown in FIG. 4, that is provided on a first side 404 of the removed layer/petal 104a. The message can be anything, including pictures, symbols, and text that causes the user to think or ponder some thought, concept, question, memory, or the like. For example, the message can be stories, questions, prayers, metaphors, poems, exercises, thoughts, or anything else that causes a user to engage in thought and, preferably, some sort of self-exploration. As a more detailed example, the message could be "think back to something you did that made you feel proud," "think back to something you accomplished that made you feel successful," "do something today that causes someone to say 'thanks'," "do something today that you can tell someone about and feel proud," and many others. Messages that invoke episodes of self-exploration, as used herein, can include, among many others, messages that invoke thoughts about self-centeredness, self-deception, self-esteem, self-examination, selfishness, self-pity, self-respect, self-restraint, self-support, and self-will, self-worth, just to name a few. Most messages can be generalized in categories that fit into groups that make a user feel or think of things that make them feel mad, sad, glad, lonely, angry, and hurt.

Figure 5:
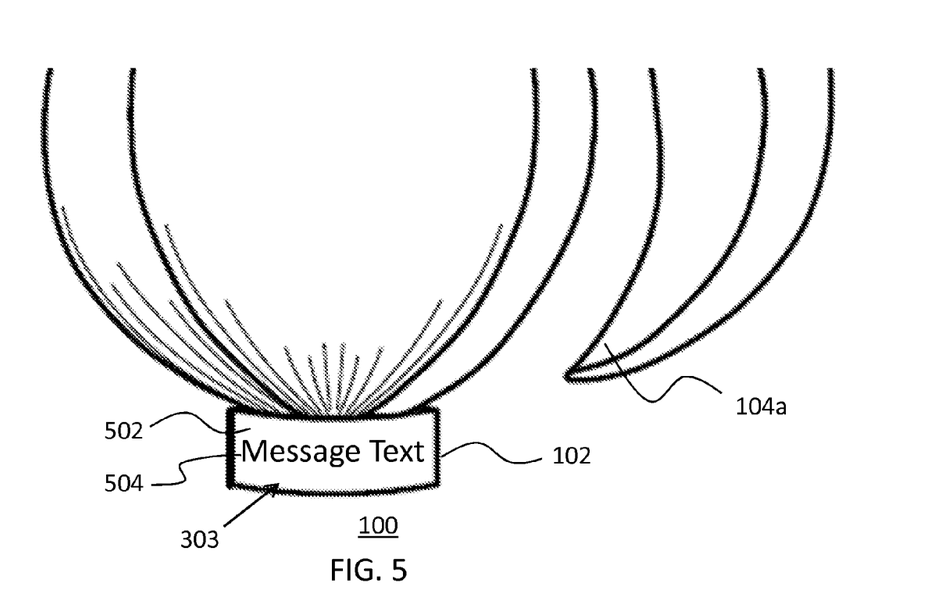
FIG. 5 is a partial close-up elevational view of a self-exploration therapeutic assembly with a display for displaying messages, in accordance with the present invention.

The message 402 can be printed directly on the petal 104a, printed on a piece of paper coupled to the layer/petal 104a, printed on an object coupled to the petal 104a, or any other way of attaching a message to the layer/petal 104a. In accordance with one embodiment of the present invention, the petal 104a is provided with an electronic display, such as an LCD screen, for example, that is able to display a message to the user. In accordance with another embodiment, as shown in FIG. 5, a central display 502 is provided and the removal of one or more of the layers/petals 104a-n causes a message 504 to be displayed on the central display 502. The central display can be, for example, an LCD screen on the base 102. In this embodiment, a central processor coupled to a memory can provide a virtually unlimited number of messages 504 on the display 502 by following a computer program. Messages stored within the memory can be updated by connection to a computer or computer network, from which new messages can by downloaded. Each one of the plurality of receiving areas 302a-n can be provided with a switch that is coupled to the processor and causes the processor to display a message 504 on the display 502 in response to one of the layers/petals 104a-n being removed from its respective one of the plurality of receiving areas 302a-n.

Figure 6:
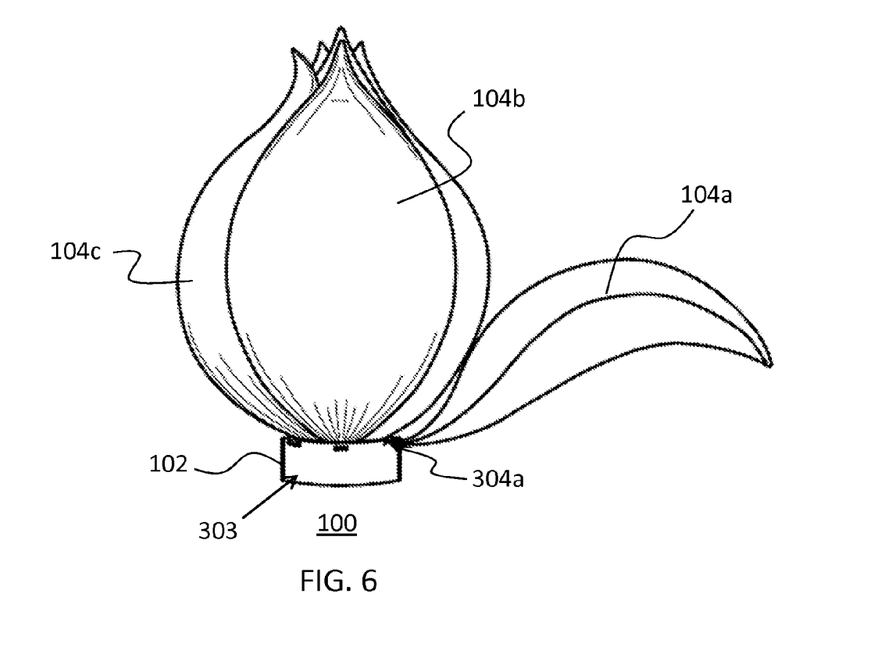
FIG. 6 is a side elevational view of a the self-exploration therapeutic assembly of FIG. 1 with the separated petal of FIG. 2 attached to the base in a second orientation, in accordance with the present invention.
Figure 7:
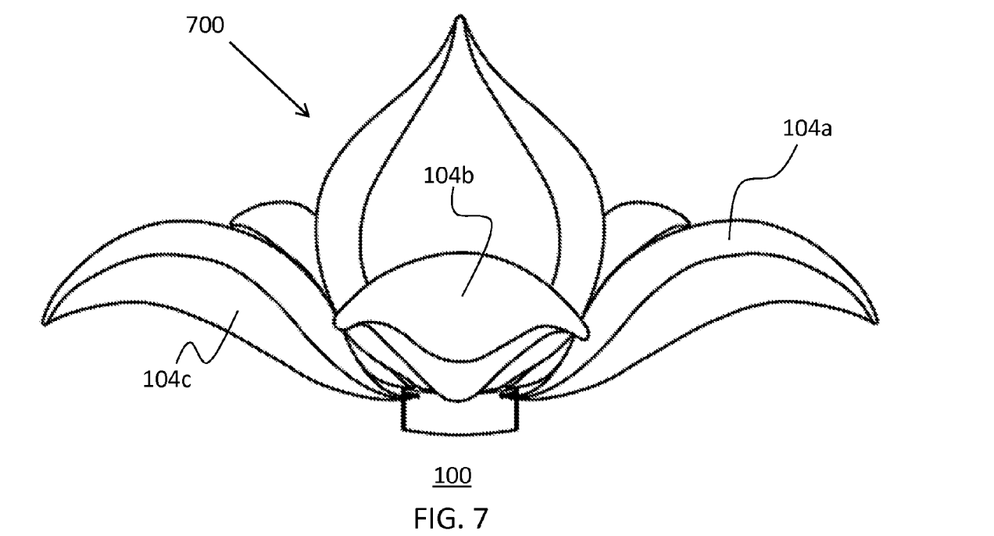
FIG. 7 is a perspective view of a the self-exploration therapeutic assembly of FIG. 1 with several petals attached to the base in a second orientation so that the self-exploration therapeutic assembly resembles a flower, in accordance with the present invention.

In step 806, the petal 104a is once again coupled to the base 102, this time, in a second orientation that is different from the first orientation shown in FIG. 1. As shown in FIG. 6, the layer/petal 104a is coupled to one of the plurality of receiving areas 304a-n on the side surface 303. The layers/petals 104a-n can also be coupled in the second orientation to one of the receiving areas 302a-n on the upper surface 301. This process is repeated with a different one of the layers/petals 104a-n during one session or in multiple therapy sessions. By removing each layer/petal 104 and replacing it in the base 102, eventually, the self-exploration therapeutic assembly 100 will no longer resemble the onion shape of FIG. 1 and will, instead, resemble a flower shape 700, such as that shown in FIG. 7. The term "flower shape," as used herein, is intended to indicate any object with petal-shaped features, where one petal-shaped feature has a dimension that extends in at least one direction different from a direction of a corresponding dimension of an adjacent petal-shaped feature. One such shape is shown in FIG. 7. It should be noted that the present invention is not limited, however, to any specific flower shape. The term "onion shape," as used herein, is intended to indicate an object with a bulbous and somewhat smooth shape. One such shape is shown in FIG. 1. It should be noted that the present invention is not limited, however, to any specific onion shape.

In accordance with one embodiment of the present invention, the flower shape 700 is formed by coupling a first group of the plurality of layers/petals 104a-n to the first group of the plurality of receiving areas 302a-n on the upper surface 301 of the base 102 and coupling a second group of the plurality of layers/petals 302a-n to the second group of the plurality of receiving areas 304a-n on the side surface 303 of the base 102.

Figure 11:
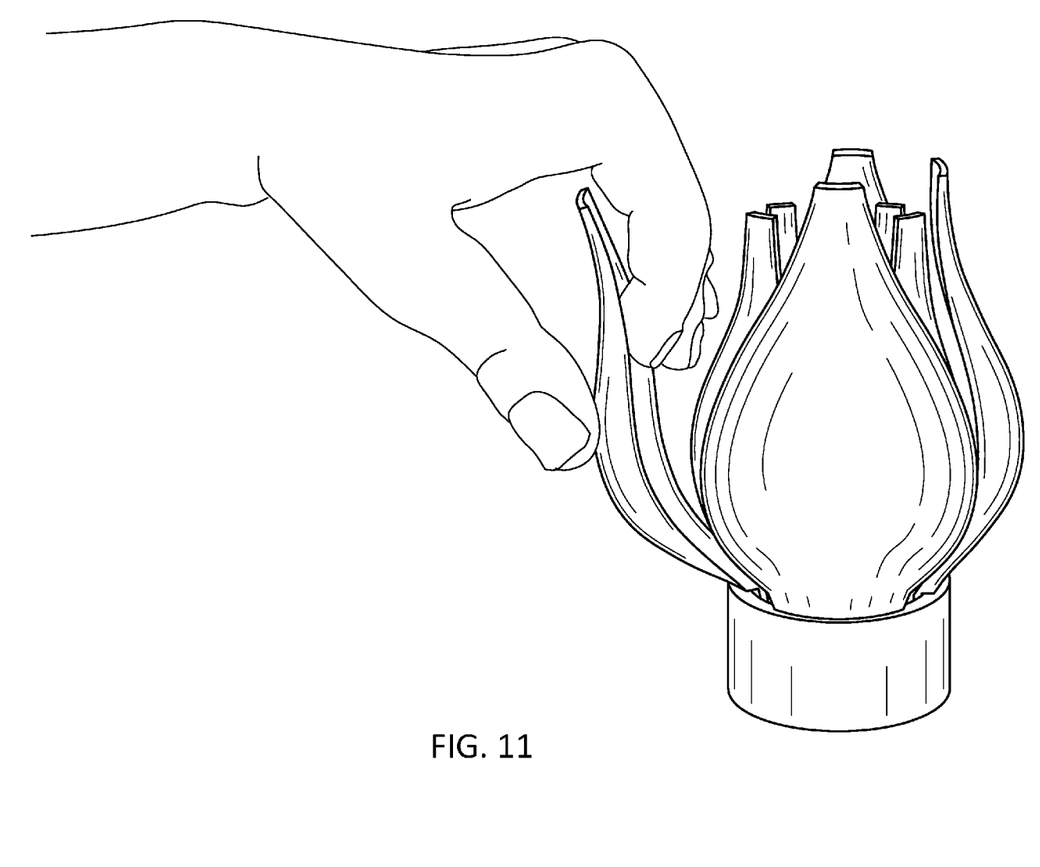
FIG. 11 is a perspective side view of the self-exploration therapeutic assembly of FIG. 1 with a user accessing a petal while the self-exploration therapeutic assembly resembles an onion in accordance with an embodiment of the present invention.
Figure 12:
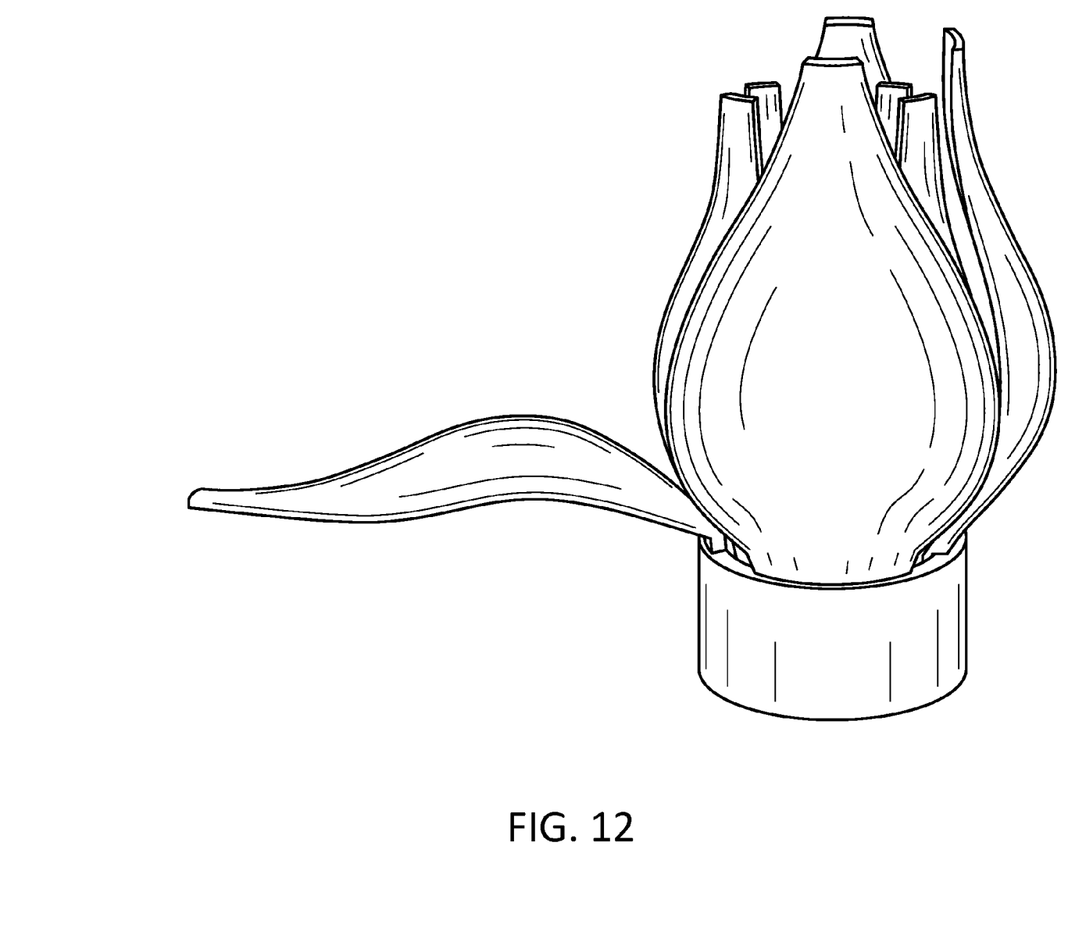
FIG. 12 is a perspective side view of the self-exploration therapeutic assembly of FIG. 11 with the petal in a changed orientation after the user has turned the petal inside-out in accordance with an embodiment of the present invention.

In accordance with yet another embodiment of the present invention, each layer/petal 104a-n is rotated substantially 180 degrees from its original orientation, which is shown in FIG. 6. This rotation can include the petal 104a-n being turned upside down, being turned directly around to face the opposite direction, or both. In addition, in accordance with one embodiment, each layer/petal 104a-n is deformable so that its orientation is changed simply by substantially turning the layer/petal 104 inside out. In other words, the bulging center portion of the layer/petal 104 is pushed through the layer/petal 104 until it bulges out in the opposite direction. This above-described deformation is illustrated within FIGS. 11 and 12. FIG. 11 illustrates a user accessing the bulging center portion of a layer/petal 104 while in the onion shape and FIG. 12 illustrates the layer/petal 104 in a changed orientation after the user has turned the layer/petal 104 inside-out. In yet another embodiment, the layer/petal 104 is provided with a hinged connection at the junction between the layer/petal 104 and the base. In this embodiment, the change of orientation from onion shape to flower shape includes a simply a rotation of the hinged connection from a first orientation to a second orientation. In yet another embodiment, the change from a first orientation to a second orientation is a simple deformation of the pliable bendable layer/petal 104.

As the process carries on, and the user: (1) continues to remove layers/petals 104a-n from the base 102, (2) reads the messages and, in some cases, (3) carries out the exercises indicated by the messages, the flower shape 700 begins to form, and the user will (4) feel a sense of accomplishment. This accomplishment, unlike the therapies of the prior art, is substantiated by physical evidence of progress along the user's journey into self-discovery.

Looking again to FIG. 8, after the user replaces the layer/petal 104 in the base 102 in the second orientation, the flow moves to step 808 where it is determined whether or not all of the layers/petals 104a-n have been removed and replaced in the new orientation. If the answer is yes, the exercise is complete and the process moves to step 812, where it stops. If the answer to step 808 is no, the process moves to step 810 where a determination is made as whether or not the user wishes to continue with the therapy session. If the answer is yes, the process moves back up to step 802, where another layer/petal 104 is removed and process starts over. If, however, the answer to step 810 is no, the exercise is complete and the process moves directly to step 812 and stops.

In accordance with an embodiment of the present invention, the messages are in the form of paper removably coupled to one of the layers/petal 104. Once the user reads the piece of paper, the user places the paper in an inventive "wish box" that is provided to accompany the inventive self-exploration therapeutic assembly 100. The wish box is any container that can receive and contain the completed messages. Advantageously, the user can later open the wish box and re-experience the messages, can send them to a processing station that exchange them with new messages, can trade them with a friend, or many other options. In addition to the flower shape of the self-exploration therapeutic assembly 100, the filled wish box represents an accomplishment achieved by the user, i.e., completion of the self-exploration therapeutic assembly 100.

Figure 9:
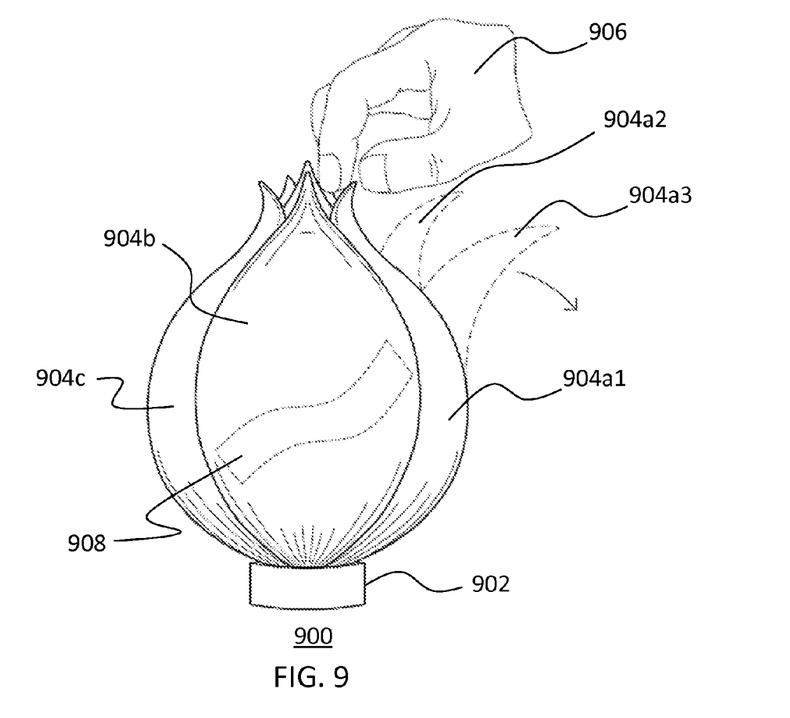
FIG. 9 is a side elevational partially-hidden view of a message concealed within a self-exploration therapeutic assembly that resembles an onion, in accordance with the present invention.

Referring now to FIG. 9, a self-exploration therapeutic assembly 900 includes a base 902. Coupled to the base 902 is a plurality of layers/petals 904a-n, where the number of layers/petals between "a" and "n" can be any number. Each layer/petal 904a-n is shaped so that when the plurality of layers/petals 904a-n are coupled to the base 902 in a first orientation, the first orientation being illustrated in FIG. 9, the plurality of layers/petals 904a-n together resemble an onion. Inside the onion-shaped self-exploration therapeutic assembly 900 is a message 908, illustrated with hidden lines.

As was explained above, a user 906 is able to reorient each of the petals 904a-n to reveal a plurality of the messages 908. FIG. 9 shows that petal 904a has at least three orientations, 904a1, 904a2, and 904a3. In this embodiment, the second 904a2 and third 904a3 orientations are simply a distortion of the petal from its original onion-resembling starting position 904a1.

Figure 10:
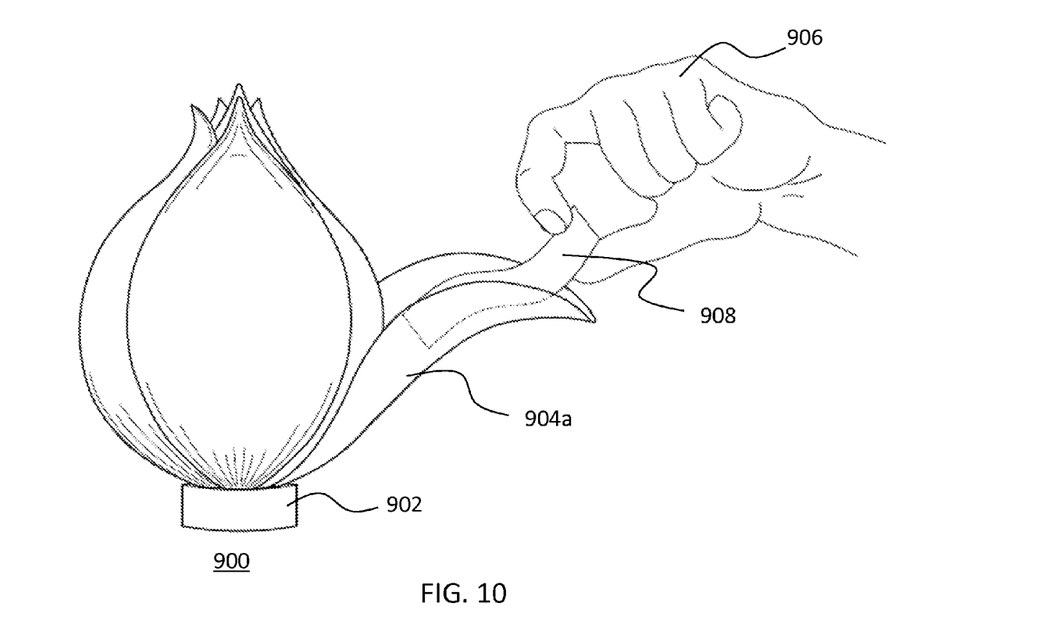
FIG. 10 is a side elevational view of the self-exploration therapeutic assembly of FIG. 9 with a petal moved to a different orientation to expose the previously-concealed message, in accordance with the present invention.

FIG. 10 provides a side elevational view of the self-exploration therapeutic assembly of FIG. 9 with the first petal 904a moved to a open orientation to expose the previously-concealed message 908, in accordance with the present invention. In this embodiment, the message 908 is shown as being printed on a tangible medium, i.e., piece of paper that can be removed from the assembly 900 and read by the user. Because the message is on a tangible medium 908, the user 906 can keep the message, review it multiple times, save it, include it in a collection, share it, or many other uses. In one embodiment, the user can display the message on his/her social networking site, for example, as the user's "status." Once shared, other users can also enjoy the message, comment on it, or share it with their friends.

Although a physical model has been shown and described herein, the present invention can be equally embodied in a virtual model, such as one generated by a processor processing compute code and represented on a computer display. In a computer-generated embodiment, the user can remove a petal from abuse by, for example, touching the petal on a touch-sensitive display screen. The computer code can then turn the petal and couple it to the base in a second orientation and then show a message to the user. Through the implementation of software, the possibility of displaying messages is greatly expanded, as virtually any size message in any format can be displayed through the combination of computer code and the display. In addition, new messages can be received at any time through software downloads via computer readable medium or network connections, such as the interact.

An assembly for facilitating self-exploration therapy has been disclosed that encourages a user to systematically follow a path of exploration by removing layers of an onion and replacing them in a slightly different orientation to reveal petals of a flower.

What is claimed is:

1. A self-exploration assembly comprising:
    a base; and
    a plurality of petals each shaped so that when the plurality of petals are coupled to the base in a first orientation, the plurality of petals together resemble an onion, and, when the plurality of petals are coupled to the base in a second orientation, the second orientation being a substantially inside out version of the first orientation, the plurality of petals resemble a flower.

2. The self-exploration assembly according to claim 1, wherein:
    the first orientation is substantially between a 90 degree and a 180 degree rotation from the second orientation.

3. The self-exploration assembly according to claim 1, wherein each of the plurality of petals comprises:
    a message on at least one surface thereof.

4. The self-exploration assembly according to claim 1, wherein the base comprises:
    a plurality of receiving areas, each receiving area shaped to accept a portion of one of the plurality of petals.

5. The self-exploration assembly according to claim 4, wherein the base comprises:
    an upper surface having a first group of the plurality of receiving areas; and a side surface having a second group of the plurality of receiving areas.

6. The self-exploration assembly according to claim 5, wherein the second orientation comprises:
    a first group of the plurality of petals coupled to the first group of the plurality of receiving areas; and a second group of the plurality of petals coupled to the second group of the plurality of receiving areas.

7. The self-exploration assembly according to claim 4, wherein:
a first one of the receiving areas defines a first longitudinal axis; and
a second one of the receiving areas defines a second longitudinal axis, the second longitudinal axis being in a different plane than the first longitudinal axis.

8. The self-exploration assembly according to claim 1, wherein:
the plurality of petals have a first shape when in the first orientation and a second shape different from the first shape when in the second orientation.

9. The self-exploration assembly according to claim 8, wherein at least two of the plurality of petals further comprises:
a substantially concave first side of the first shape when in the first orientation and a substantially convex first side of the second shape when in the second orientation.

10. A self-exploration assembly comprising:
a base defining a plurality of receiving areas; and
a plurality of petals each having a securing member shaped to couple to a one of the plurality of receiving areas and each shaped so that when the plurality of petals are coupled to the base in a first orientation, the plurality of petals together resemble an onion, and, when the plurality of petals are coupled to the base in a second orientation substantially opposite the first orientation, the plurality of petals resemble a flower.

11. The self-exploration assembly according to claim 10, wherein:
the first orientation is substantially a 180 degree rotation from the second orientation.

12. The self-exploration assembly according to claim 10, wherein each of the plurality of petals comprises:
a message on at least one surface thereof.

13. The self-exploration assembly according to claim 10, wherein the base comprises:
a plurality of receiving areas, each receiving area shaped to accept a portion of one of the plurality of petals.

14. The self-exploration assembly according to claim 13, wherein the base comprises:
an upper surface having a first group of the plurality of receiving areas; and
a side surface having a second group of the plurality of receiving areas.

15. The self-exploration assembly according to claim 14, wherein the second orientation comprises:
a first group of the plurality of petals coupled to the first group of the plurality of receiving areas; and
a second group of the plurality of petals coupled to the second group of the plurality of receiving areas.

16. The self-exploration assembly according to claim 10, wherein:
the plurality of petals have a first shape when in the first orientation and a second shape different from the first shape when in the second orientation.

17. A method of conducting self-discovery, the method comprising:
providing:
a base; and
a plurality of petals each shaped so that when the plurality of petals are coupled to the base in a first orientation, the plurality of petals together resemble an onion, and, when the plurality of petals are coupled to the base in a second orientation, the plurality of petals resemble a flower;
coupling each of the plurality of petals to the base in the first orientation; and individually turning each petal inside out to achieve the second orientation.

18. The method of conducting self-discovery according to claim 17, further comprising:
reading a message coupled to a first one of the plurality of petals after individually turning the first petal inside out to achieve the second orientation.

19. The method of conducting self-discovery according to claim 17, wherein:
the message is printed on a first side of the first one of the plurality of petals.

20. The method of conducting self-discovery according to claim 17, wherein:
the message is printed on an object coupled to a first side of the first one of the plurality of petals.

21. The method of conducting self-discovery according to claim 20, wherein the object comprises:
a piece of paper.

* * * * *